US008643611B2

(12) United States Patent  
Seo et al.

(10) Patent No.: US 8,643,611 B2  
(45) Date of Patent: Feb. 4, 2014

(54) MOBILE TERMINAL AND METHOD FOR CONTROLLING OPERATION OF THE SAME

(75) Inventors: Jihye Seo, Seoul (KR); Minhun Kang, Seoul (KR); Insu Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 779 days.

(21) Appl. No.: 12/782,627

(22) Filed: May 18, 2010

(65) Prior Publication Data

US 2010/0295808 A1  Nov. 25, 2010

(30) Foreign Application Priority Data

May 20, 2009  (KR) ........................ 10-2009-0044038

(51) Int. Cl.  
*G06F 3/041*  (2006.01)

(52) U.S. Cl.  
USPC .......................................................... 345/173

(58) Field of Classification Search  
USPC .................................................. 345/156–179  
See application file for complete search history.

(56) References Cited

U.S. PATENT DOCUMENTS

| | | | |
|---|---|---|---|
| 2007/0216760 A1* | 9/2007 | Kondo et al. | 348/14.02 |
| 2008/0148152 A1* | 6/2008 | Blinnikka et al. | 715/719 |
| 2010/0122195 A1* | 5/2010 | Hwang | 345/173 |

* cited by examiner

*Primary Examiner* — Waseem Moorad  
(74) *Attorney, Agent, or Firm* — Lee, Hong, Degerman, Kang & Waimey

(57) ABSTRACT

A mobile terminal including at least two display regions is provided. A moving image that is being reproduced on a first display region of the mobile terminal or a still image that is being displayed on the first display region can be enlarged and reproduced or displayed on a second display region. Accordingly, the user can easily check (or view) moving or still images included in a webpage screen displayed on the first display region.

17 Claims, 11 Drawing Sheets (a)

(b)

(c)

(a)

(b)

MOBILE TERMINAL AND METHOD FOR CONTROLLING OPERATION OF THE SAME

CROSS-REFERENCE TO RELATED APPLICATION

Pursuant to 35 U.S.C. §119(a), this application claims the benefit of earlier filing date and right of priority to Korean Patent Application No. 10-2009-0044038, filed on May 20, 2009, the contents of which are all hereby incorporated by reference herein in its entirety.

BACKGROUND OF THE INVENTION

1. Field of the Invention

The present invention relates to a mobile terminal including at least two display regions and a method for controlling the operation of the mobile terminal, and more particularly to a mobile terminal, which includes at least two display regions and can enlarge and reproduce a moving image or enlarge and display a still image on at least one of the display regions, and a method for controlling the operation of the mobile terminal.

2. Description of the Related Art

A mobile terminal is a portable device having a function to perform voice and video communication, a function to receive and output information, or a function to store data. As the functionality of the mobile terminal has been diversified, a mobile terminal having various complicated functions such as a function to capture still or moving images (i.e., photographs or videos), a function to reproduce music or video files, a game function, a function to receive broadcasts, and a wireless Internet function has been implemented as an all-in-one multimedia player.

Various novel attempts have been made in terms of hardware or software to achieve more complicated functions of the mobile terminal implemented as a multimedia player. One example is provision of a user interface environment allowing the user to easily and conveniently find and select a desired function. As the mobile terminal is now considered a personal belonging expressing the user's personality, there has been demand for various interface designs such as a double-sided Liquid Crystal Display (LCD), which can be viewed from both sides, or a touch screen.

However, allocation of space for a user interface such as a keypad or a display is restricted since the mobile terminal should be designed taking into consideration mobility or portability. To efficiently use various functions provided by the mobile terminal, there is a need to control the operation of the mobile terminal using a new input/output scheme instead of a conventional scheme in which menu items in a complicated structure are sequentially selected.

SUMMARY OF THE INVENTION

Therefore, the present invention has been made in view of the above problems, and it is an object of the present invention to provide a mobile terminal, which includes at least two display regions and can enlarge and reproduce a moving image or enlarge and display a still image on at least one of the display regions, and a method for controlling the operation of the mobile terminal.

It is another object of the present invention to provide a mobile terminal, which can automatically enlarge and display a moving or still image even though a user has not input a corresponding command, and a method for controlling the operation of the mobile terminal.

In accordance with an aspect of the present invention, the above and other objects can be accomplished by the provision of a method for controlling operation of a mobile terminal, the method comprising displaying a webpage screen including a moving image or a still image on a first display region, and reproducing the moving image on a second display region or displaying the still image on the second display region.

In accordance with another aspect of the present invention, the above and other objects can also be accomplished by the provision of a mobile terminal comprising a first display region, a second display region, and a controller that displays a webpage screen including a moving or still image on the first display region and reproduces the moving image on the second display region or displays the still image on the second display region.

In accordance with another aspect of the present invention, the above and other objects can also be accomplished by the provision of a processor-readable recording medium which stores a program causing a processor to perform the above method.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

The present invention will now be described in more detail with reference to the drawings.

A mobile terminal as described in this specification includes a mobile phone, a smart phone, a laptop, a digital broadcast terminal, a Personal Digital Assistant (PDA), a Portable Multimedia Player (PMP), a navigation device, or the like.

Figure 1:
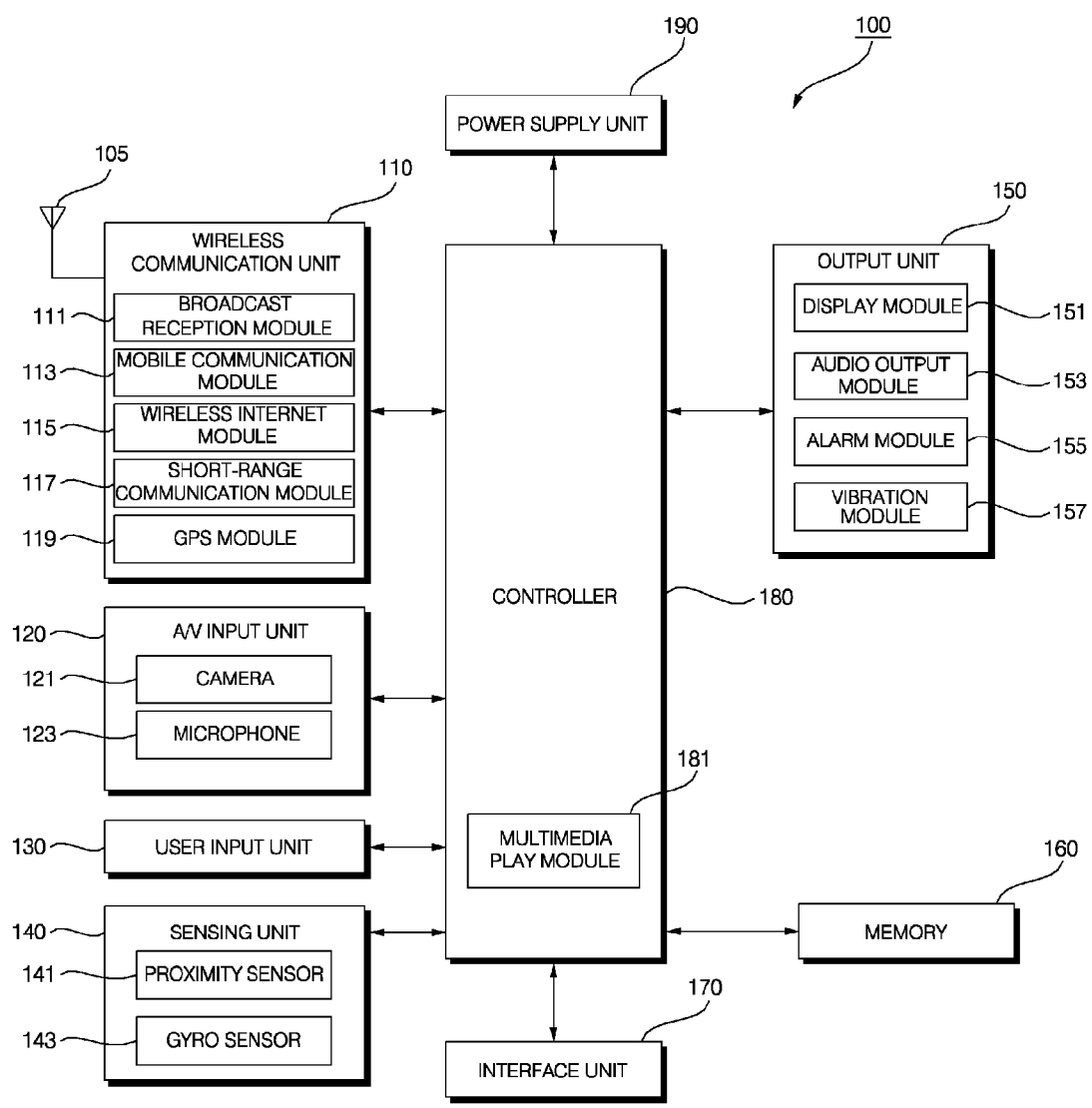
FIG. 1 is a block diagram of a mobile terminal according to an embodiment of the present invention.

FIG. 1 is a block diagram of a mobile terminal according to an embodiment of the present invention. The mobile terminal according to the embodiment of the present invention is described below with reference to FIG. 1, from the viewpoint of functional components thereof.

As shown in FIG. 1, the mobile terminal 100 may include a wireless communication unit 110, an Audio/Video (AV) input unit 120, a user input unit 130, a sensing unit 140, an output unit 150, a memory 160, an interface unit 170, a controller 180, and a power supply unit 190. In actual applications, two or more of these components may be combined into one component or one component may be divided into two or more components as needed. For example, the A/V input unit 120 or the sensing unit 140 may be incorporated into the user input unit 130.

The wireless communication unit 110 may include a broadcast receiving module 111, a mobile communication module 113, a wireless Internet module 115, a short range communication module 117, and a Global Positioning System (GPS) module 119.

The broadcast receiving module 111 receives at least one of a broadcast signal and broadcast-related information from an external broadcast management server through a broadcast channel. The broadcast channel may include a satellite channel, a terrestrial channel, or the like. The broadcast management server may be a server that generates and transmits at least one of a broadcast signal and broadcast-related information or a server that receives and transmits at least one of a broadcast signal and broadcast-related information, which have been previously generated, to a terminal.

The broadcast-related information may be information relating to a broadcast channel, a broadcast program, or a broadcast service provider. The broadcast signal may not only include a TV broadcast signal, a radio broadcast signal, or a data broadcast signal but may also include a broadcast signal generated by incorporating a data broadcast signal into a TV or radio broadcast signal. The broadcast-related information may also be provided through a mobile communication network. In this case, the broadcast-related information may be received by the mobile communication module 113. The broadcast-related information may be provided in various forms. For example, the broadcast-related information may be provided in the form of a Digital Multimedia Broadcasting (DMB) Electronic Program Guide (EPG) or a Digital Video Broadcast-Handheld (DVB-H) Electronic Service Guide (ESG).

The broadcast receiving module 111 receives a broadcast signal using a variety of broadcast systems. Specifically, the broadcast receiving module 111 may receive a digital broadcast signal using a digital broadcast system such as a Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), or Integrated Services Digital Broadcast-Terrestrial (ISDB-T) system. The broadcast receiving module 111 may be configured to be suitable not only for such a digital broadcast system but also for any other broadcast system that provides a broadcast signal. A broadcast signal and/or broadcast-related information received through the broadcast receiving module 111 may be stored in the memory 160.

The mobile communication module 113 transmits and receives a wireless signal to and from at least one of a base station, an external terminal, and a server over a mobile communication network. The wireless signal may include a voice call signal, a video call signal, or various types of data associated with transmission and reception of a text/multimedia message.

The wireless Internet module 115 is an internal or external module for wireless Internet access which may be provided to the mobile terminal 100.

The short range communication module 117 is a module for local area communication. Here, Bluetooth, Radio Frequency Identification (RFID), Infrared Data Association (IrDA,), Ultra Wideband (UWB), or ZigBee may be used as a local area communication technology. The GPS module 119 receives location information from multiple GPS satellites.

The A/V input unit 120 is provided to input an audio or video signal and may include a camera 121 and a microphone 123. The camera 121 processes an image frame such as a still image (or photograph) or a moving image (or video) obtained through an image sensor in a video communication mode or an image capture mode. The processed picture frame may be displayed on the display module 151.

The picture frame processed at the camera 121 may be stored in the memory 160 or may be transmitted to the outside through the wireless communication unit 110. Two more cameras 121 may be provided depending on the configuration of the mobile terminal.

The microphone 123 receives an external audio signal in a voice or video communication mode, a record mode, or a voice recognition mode and processes the same into audio data. In the voice or video communication mode, the processed audio data may be converted into a form transmittable to a mobile communication base station through the mobile communication module 113. A variety of noise removal algorithms may be used to remove noise generated in the course of receiving an external audio signal through the microphone 123.

The user input unit 130 generates key input data corresponding to a key input operation that a user has performed to control the operation of the terminal. The user input unit 130 may include a key pad, a dome switch, a (resistive/capacitive) touchpad, a jog wheel, a jog switch, a finger mouse, or the like. In the case where the touchpad forms a multilayer structure with the display module 151 that is described later, the touchpad may be referred to as a "touch screen".

The sensing unit 140 detects a current state of the mobile terminal 100 such as whether the mobile terminal 100 is opened or closed, the position of the mobile terminal 100, or whether or not the user is in contact with the mobile terminal 100 and generates a sensing signal for controlling the operation of the mobile terminal 100. The sensing unit 140 may sense whether the mobile terminal 100 is opened or closed when the mobile terminal 100 is a slide phone. The sensing unit 140 may also be responsible for sensing functions associated with whether or not the power supply unit 190 is supplying power or whether or not the interface unit 170 is coupled to an external device.

The sensing unit 140 may include a proximity sensor 141. The proximity sensor 141 can detect presence or absence of an object that is approaching or near to the sensing unit 140 without mechanical contact. The proximity sensor 141 can detect a close object using change of AC magnetic fields or change of magnetostatic fields or using the rate of change of capacitance. Two or more proximity sensors 141 may be provided depending on the configuration of the mobile terminal.

The sensing unit 140 may include a gyro sensor 143. The gyro sensor 143 includes an inertial sensor, an acceleration sensor, or any sensor which detects movement of an object using a gyroscope. The gyroscope is classified into a mechanical gyroscope, a ring laser gyroscope, and a fiber optic gyroscope. The gyro sensor 143 detects movement of the mobile terminal and provides a signal for controlling the mobile terminal.

The output unit 150 is provided to output an audio or video signal or an alarm signal and may include a display module 151, an audio output module 153, an alarm unit 155, and a vibrating module 157.

The display module 151 displays information processed in the mobile terminal 100. For example, when the mobile terminal 100 is in a voice or video communication mode, the display module 151 displays a communication-related User Interface (UI) or Graphical User Interface (GUI). When the mobile terminal 100 is in a video communication mode or an image capture mode, the display module 151 may individually or simultaneously display captured or received images and may display a corresponding UI or GUI.

In the case where the display module 151 forms a multi-layer structure with the touchpad to construct a touch screen as described above, the display module 151 may not only be used as an output device but may also be used as an input device. In the case where the display module 151 constructs a touch screen, the display module 151 may include a touch screen panel, a touch screen panel controller, or the like. The touch screen panel is a transparent panel externally attached to the mobile terminal 100 and may be connected to an internal bus of the mobile terminal 100. The touch screen panel monitors touches and sends, upon detecting a touch input, corresponding signals to the touch screen panel controller. The touch screen panel controller processes the signals and transmits the resulting data to the controller 180 and the controller 180 then determines whether or not a touch input has occurred and which region of the touch screen has been touched.

The display module 151 may include at least one of a liquid crystal display, a thin film transistor-liquid crystal display, an organic light-emitting diode, a flexible display, a transparent display, and a 3D display. Two or more display modules 151 may be provided depending on the implementation of the mobile terminal 100. For example, both an external display module (not shown) and an internal display module (not shown) may be provided to the mobile terminal 100.

The audio output module 153 outputs audio data received from the wireless communication unit 110 or stored in the memory 160 when the mobile terminal 100 is in an incoming call receiving mode (i.e., a ringing mode), a voice or video communication mode, a record mode, a voice recognition mode, or a broadcast receiving mode. The audio output module 153 outputs audio signals associated with functions performed by the mobile terminal 100, for example, an audio signal associated with an incoming call sound (i.e., ringtone) or a message receipt sound. The audio output module 153 may include a speaker, a buzzer, or the like.

The alarm unit 155 outputs a signal notifying the user that an event has occurred in the mobile terminal 100. Examples of the event occurring in the mobile terminal 100 include incoming call reception, message reception, and key signal input. The alarm unit 155 outputs a signal notifying the user of the occurrence of an event in a different form from the audio or video signal. For example, the alarm unit 155 may output the notification signal through vibration. When an incoming call signal is received or when a message is received, the alarm unit 155 may output a signal indicating the reception of the incoming call signal or the message. When a key signal is input, the alarm unit 155 may output a signal as a feedback to the key signal input. The user can perceive the event occurrence through the signal output from the alarm unit 155. Of course, the signal indicating the event occurrence may also be output through the display module 151 or the audio output module 153.

The vibrating module 157 may generate vibration having varying degrees of intensity and patterns according to a vibration signal transmitted by the controller 180. The strength, pattern, frequency, moving direction, moving speed, and the like of the vibration generated by the vibrating module 157 may be set by the vibration signal. Two or more vibration modules 157 may be provided depending on the mode of implementation of the mobile terminal 100.

The memory 160 may store a program for processing and control by the controller 180 and may function to temporarily store input or output data items (for example, a phonebook, messages, still images, and moving images).

The memory 160 may include a storage medium of at least one of a variety of types including a flash memory type, a hard disk type, a multimedia card micro type, a card memory type (for example, SD or XD memory), RAM, and ROM. The mobile terminal 100 may utilize cloud storage that performs a storage function of the memory 160 over the Internet.

The interface unit 170 functions to interface with all external devices connected to the mobile terminal 100. Examples of the external devices connected to the mobile terminal 100 include a wired/wireless headset, an external battery charger, a wired/wireless data port, a memory card, a card socket such as an SIM/UIM card socket, an audio Input/Output (I/O) terminal, a video I/O terminal, and an earphone. The interface unit 170 may receive power or data from such an external device and provide the same to each internal component of the mobile terminal 100 and may transmit internal data of the mobile terminal 100 to the external device.

The controller 180 generally controls the operation of each component to control the overall operation of the mobile terminal 100. For example, the controller 180 performs control and processing associated with voice communication, data communication, video communication, and the like. The controller 180 may include a multimedia playback module 181 for multimedia reproduction. The multimedia playback module 181 may be implemented by hardware in the controller 180 or may be implemented by software separately from the controller 180.

Under control of the controller 180, the power supply unit 190 receives external power or internal power and supplies power required for operation to each component.

The mobile terminal according to the present invention has been described above from the viewpoint of functional components thereof. In the following, the mobile terminal according to the present invention is described in detail with reference to FIGS. 2 and 3, from the viewpoint of components viewed on the external surface thereof. For ease of explanation, the following description will be given with reference to a bar type mobile terminal having a front touch screen as an example among various types of mobile terminals such as folder, bar, swing, and slider types. However, the present invention is not limited to the bar type mobile terminal and can be applied to any type of mobile terminal including the types described above.

Figure 2:
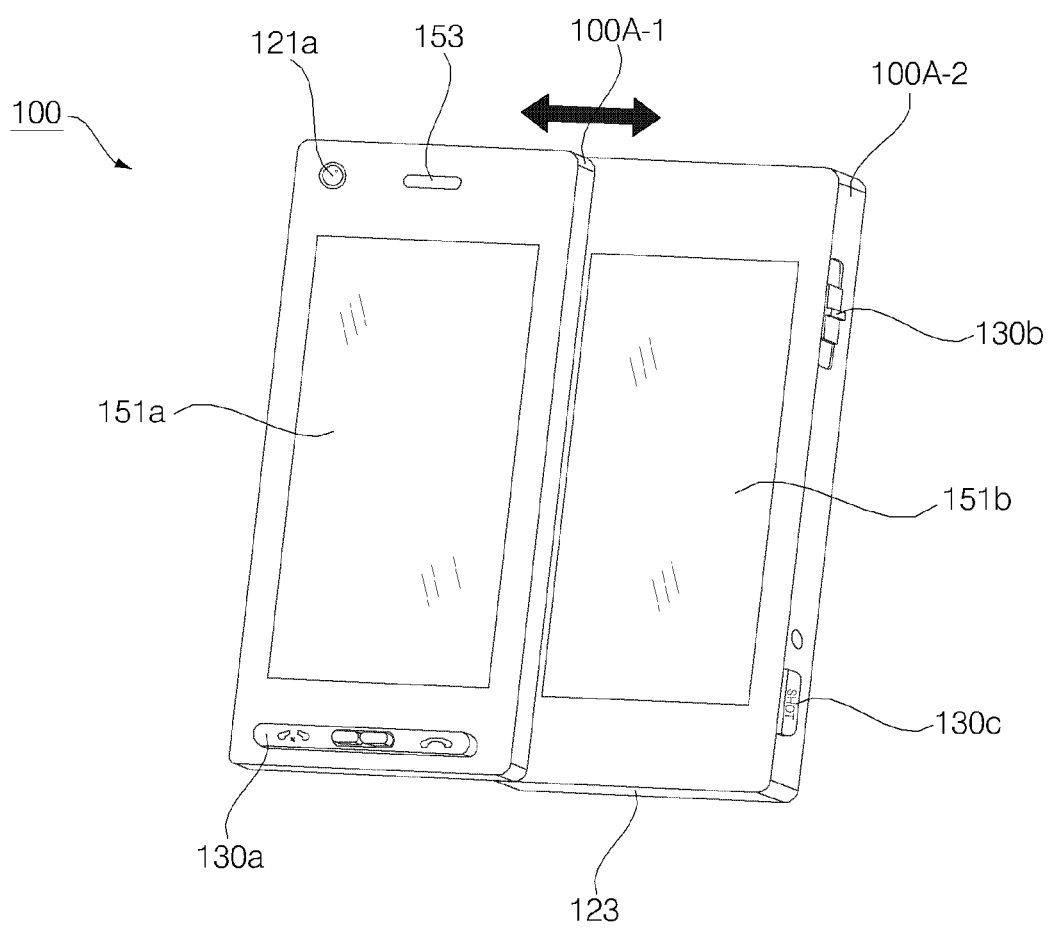
FIG. 2 is a front perspective view of a mobile terminal according to an embodiment of the present invention.

FIG. 2 is a front perspective view of a mobile terminal according to an embodiment of the present invention. As shown in FIG. 2, a case defining the external appearance of the mobile terminal 100 includes a front case 100A-1 and a rear case 100A-2. A variety of electronic parts are provided in a space defined within the front and rear cases 100A-1 and 100A-2. At least one intermediate case may be additionally provided between the front case 100A-1 and the rear case 100A-2. These cases may be formed through synthetic resin injection molding may be formed of a metal material such as stainless steel (STS) or titanium (Ti).

A first display module 151*a*, which is an external display module, a first audio output module 153*a*, a first camera 121*a*, and a first user input unit 130*a* may be arranged in a main body of the mobile terminal 100, specifically, in the front case 100A-1. A second display module 151*b*, which is an internal display module, a second user input unit 130*b*, a third user input unit 130*c*, and a microphone 123 may be arranged on a side surface of the rear case 100A-2.

The display module 151 includes a Liquid Crystal Display (LCD), Organic Light Emitting Diodes (OLED), or the like to visually express information. A touchpad may be formed in a layered structure overlapping the display module 151 such that the display module 151 operates as a touch screen allowing the user to input information through touching.

The first audio output module 153a may be implemented in a receiver or speaker form. The first camera 121a may be implemented to be suitable for capturing a still or moving image of the user or the like. The microphone 123 may be implemented in a form suitable for receiving sound such as user voice.

The first to third user input units 130a, 130b, and 130c may be collectively referred to as a user input unit 130. The user input unit 130 may be of any type, provided that the user input unit 130 is operated in a tactile manner such that it is operated through tactile interaction with the user.

For example, the user input unit 130 may be implemented as a dome switch or a touchpad that can receive a command or information through a push or touch operation by the user. The user input unit 130 may also be implemented as a jog wheel or a joystick. In terms of functionality, the first user input unit 130a allows the user to input a command such as start, end, or send and the second user input unit 130b allows the user to select an operating mode of the mobile terminal 100. The third user input unit 130c may function as a hot key for activating a special function of the mobile terminal 100.

When a finger of the user comes close to the display module 151, the proximity sensor 141 mounted on a first body detects the finger and outputs a close signal. Here, the proximity sensor 141 may be configured to output a different close signal according to the distance of the finger of the user from the proximity sensor 141. Generally, a proximity sensor outputs a close signal when an object has come within a so-called "detection distance". Multiple proximity sensors having different detection distances may be used to determine object proximity by comparing close signals output from the multiple proximity sensors.

Multiple proximity sensors having different detection regions may also be provided on the mobile terminal 100 to determine both a region on the display module 151 which an object has approached and whether or not an object has moved after approaching the display module 151 by identifying which proximity sensor(s) has output a close signal among the multiple proximity sensors. The controller 180 may also perform a control operation to select a key corresponding to a location at which the user's finger or the like has approached the display module 151 and to output a vibrating signal corresponding to the key.

When the user inclines or shakes the mobile terminal, the gyro sensor 143 detects movement of the mobile terminal. The gyro sensor 143 generates a signal corresponding to movement of the mobile terminal and outputs the signal to the controller 180. The controller 180 detects movement-related information such as moving direction, angle, speed, and current position of the mobile terminal from the signal generated by the gyro sensor 143.

The controller 180 tracks movement of the mobile terminal through the information detected from the signal generated by the gyro sensor 143. Information that can be detected from the signal generated by the gyro sensor 143 may vary depending on the constituent parts of the gyro sensor 143. The gyro sensor 143 included in the mobile terminal is designed according to movement information of the mobile terminal that needs to be detected. The mobile terminal may include at least one gyro sensor 143. The controller 180 may control the gyro sensor 143 to operate only when a specific application is running according to information that needs to be detected.

Figure 3:
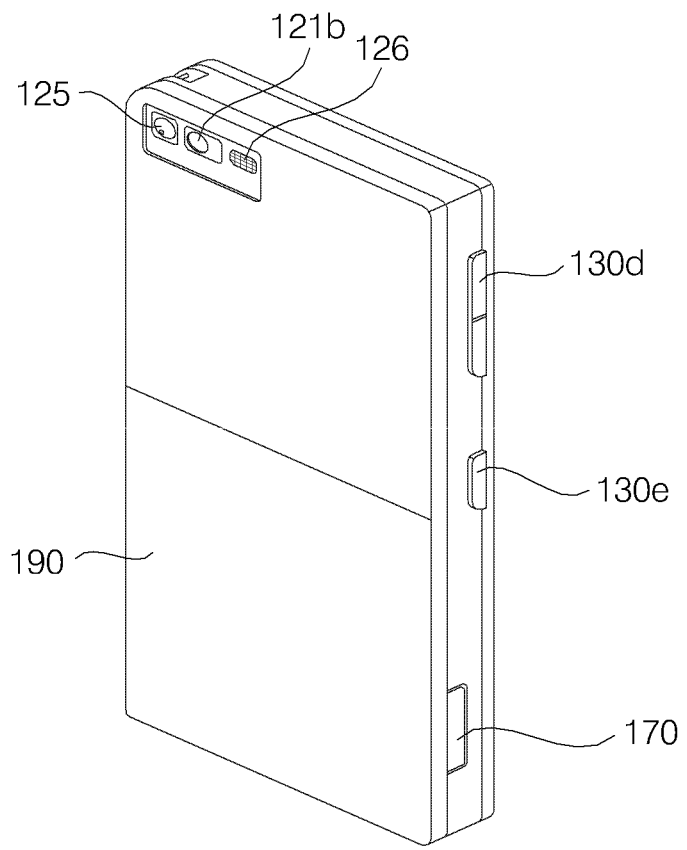
FIG. 3 is a rear perspective view of a mobile terminal according to an embodiment of the present invention.

FIG. 3 is a rear perspective view of the mobile terminal shown in FIG. 2. As shown in FIG. 3, a fourth user input unit 130d, a fifth user input unit 130e, and an interface unit 170 may be provided on a side surface of the rear case 100A-2 and a second camera 121b may be additionally provided on a rear surface of the rear case 100A-2.

The second camera 121b may have a capture direction substantially opposite to that of the first camera 121a and have a different pixel resolution from that of the first camera 121a. For example, the first camera 121a preferably has a low pixel resolution such that it is suitable to capture and transmit an image of the face of the user, for example, in the case of video communication and the second camera 121b preferably has a high pixel resolution since, when the user captures a general object using the second camera 121b, the user generally does not immediately transmit the captured image.

A mirror 125 and a flash lamp 126 may be additionally provided on the mobile terminal 100 near the second camera 121b. The mirror 125 allows the user to view their face or the like when capturing themselves using the second camera 121b (i.e., in the case of self-shooting). The flash lamp 126 shines light toward a subject when the subject is captured using the second camera 121b.

A second audio output module (not shown) may be additionally provided on the rear case 100A-2. The second audio output module may implement a stereo function in conjunction with the first audio output module 153a and may be used to perform voice or video communication in a speakerphone mode.

In addition to an antenna for communication, an antenna for receiving broadcast signals (not shown) may be provided on the rear case 100A-2 at a portion thereof. Each antenna may be mounted to be retractable from the rear case 100A-2.

The interface unit 170 is a channel through which the mobile terminal 100 can exchange data or the like with an external device. For example, the interface unit 170 may be at least one of a connection terminal for wired or wireless connection to an earphone, a port for local area communication, and power supply terminals for supplying power to the mobile terminal 100. The interface unit 170 may be a card socket for receiving an external card such as a Subscriber Identification Module (SIM), a User Identity Module (UIM), or a memory card for information storage.

A power supply unit 190 for supplying power to the mobile terminal 100 is provided on the rear case 100A-2. The power supply unit 190 is, for example, a rechargeable battery which is detachably mounted to the rear case 100A-2 for the purpose of recharging or the like.

Although the above description has been given with reference to an example where the second camera 121b is provided on the rear case 100A-2, the present invention is not limited to this example. When the second camera 121b is not provided, the first camera 121a may be formed to be rotatable so as to enable capturing in the same capture direction as that of the second camera 121b.

Figure 4:
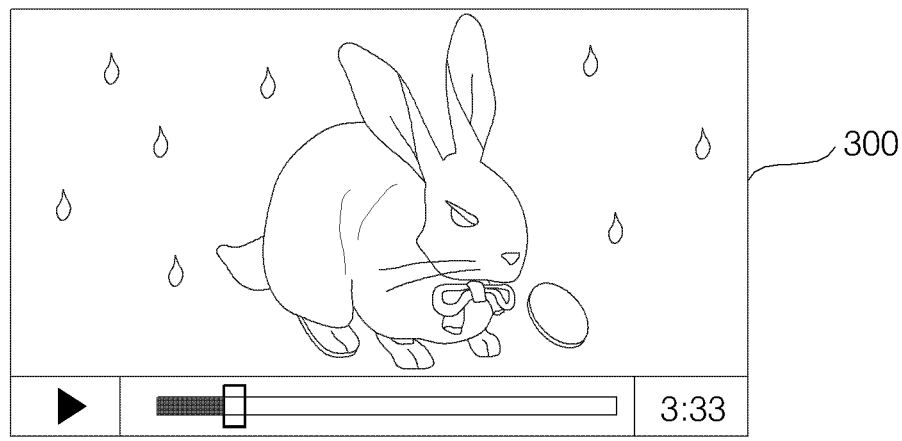
FIG. 4 illustrate diagrams for explaining a method of operating the mobile terminal according to an exemplary of the present invention.
Figure 4:
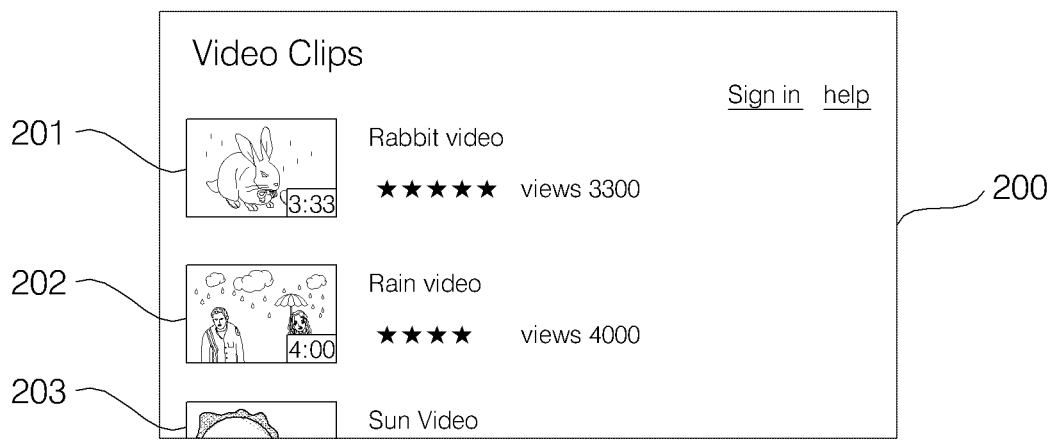

FIG. 4 illustrates screens displayed on a display module of a mobile terminal according to a first embodiment of the present invention. As shown in FIG. 4, the mobile terminal according to the first embodiment of the present invention includes a first display region 200 displayed on the first display module 151a and a second display region 300 displayed on the second display module 151b. In another embodiment, the first display region 200 and the second display region 300 may be displayed on one display module. Thus, the first embodiment of the present invention does not limit the scope of the present invention.

The controller 180 may display a webpage screen on the first display region 200. The webpage screen may include a moving image (or video) or a still image (or photograph). In the first embodiment of the present invention, the webpage screen displayed on the first display region 200 includes at least two moving images 201, 202, and 203.

Upon determining that moving images are included in the webpage screen displayed on the first display region 200, the controller 180 reproduces a moving image on the second display region 300. In this embodiment, the controller 180 reproduces the first moving image 201 among the moving images included in the webpage screen on the second display region 300. The controller 180 may display a moving image that is currently being reproduced among the moving images included in the webpage screen, a moving image, sound of which is currently being output, or a moving image selected by a user on the second display region 300. When at least two moving images are included in the webpage screen, the controller 180 may sequentially reproduce the moving images on the second display region 300.

Figure 5:
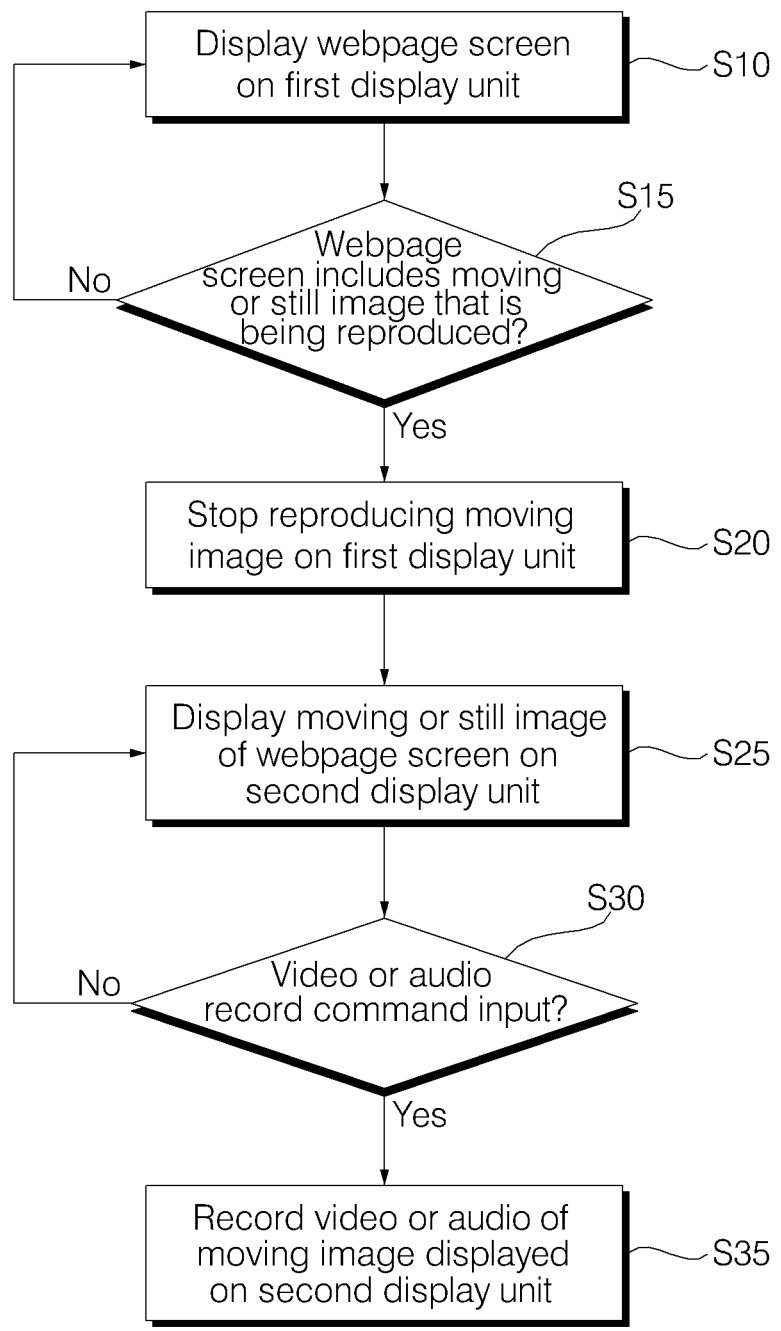
FIGS. 5 through 6 illustrate flowcharts of a method of operating the mobile terminal according to an exemplary embodiment of the present invention.

FIG. 5 is a flow chart of a method for controlling the operation of a mobile terminal according to a second embodiment of the present invention. As shown in FIG. 5, the controller 180 displays a webpage screen on the first display region 200 of the first display module (S10). The mobile terminal may access a web server wirelessly or by wire. The controller 180 displays a webpage screen of the accessed web server on the first display region 200.

The controller 180 determines whether or not a moving or still image is included on the webpage screen displayed on the first display region 200 (S15). Each moving image included in the webpage screen may be currently being reproduced (or played) or may be currently stopped from being reproduced. The moving image may be included in the webpage screen such that only a single captured frame of the moving image is displayed on the webpage screen. In this embodiment, at least one of the moving images included in the webpage screen is being reproduced.

When a moving or still image(s) is included in the webpage screen displayed on the first display region 200, the controller 180 stops reproducing the moving image on the first display region 200 (S20). The controller 180 then reproduces at least one of the moving images included in the webpage screen on the second display region 300 (S25). The moving image that the controller 180 reproduces on the second display region 300 may be a moving image, reproduction of which has been stopped on the first display region 200. The moving image that the controller 180 reproduces on the second display region 300 may also be a moving image that the user has selected from among the moving images included in the webpage screen. In addition, the controller 180 may sequentially reproduce moving images included in the webpage screen on the second display region 300. The controller 180 may also display a still image included in the webpage screen on the second display region 300.

The controller 180 determines whether or not a moving image video or audio record command has been input to the mobile terminal (S30). In the case where the controller 180 has displayed a still image on the second display region 300, the controller 180 determines whether or not a command to store the still image has been input to the mobile terminal.

In the case where the second display module 151*b* on which the second display region 300 is displayed is a touch screen, the controller 180 determines that a moving image video or audio record command has been input when the second display region 300 has been touched. The controller 180 may display a moving image video or audio record icon on the first display region 200 or the second display region 300. When the video or audio record icon has been operated, the controller 180 determines that a command to record video or audio of the moving image that is being reproduced on the second display region 300 has been input.

Upon determining that the video or audio record command has been input, the controller 180 records video or audio of the moving image that is being reproduced on the second display region 300 (S35). The user may specify a path for storage of the moving image to be recorded. The user may record only audio of the moving image that is being reproduced.

Figure 6:
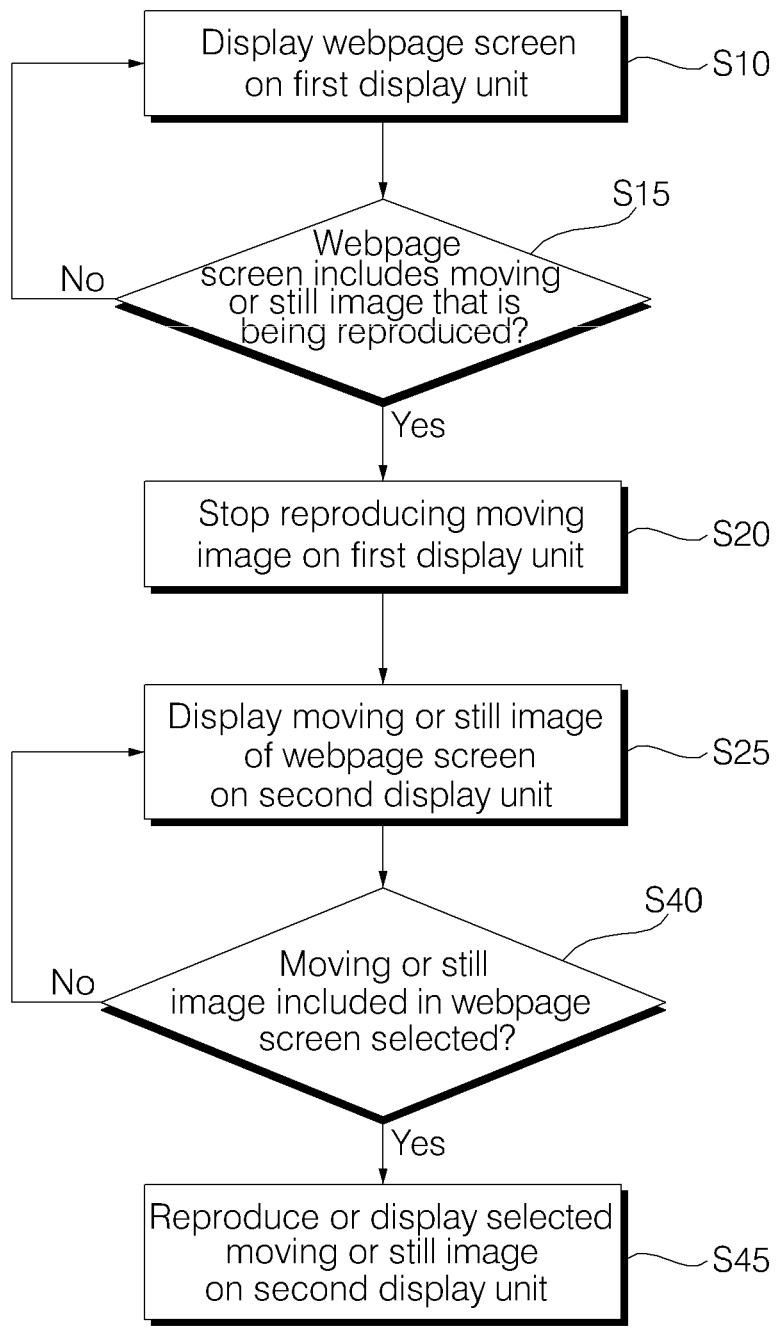

FIG. 6 is a flow chart of a method for controlling the operation of a mobile terminal according to a third embodiment of the present invention. In this embodiment, the user may select a moving or still image, which is to be reproduced or displayed on the second display region, from among moving or still images included in a webpage screen.

The controller 180 displays a webpage screen on the first display region 200 and reproduces a moving image included in the webpage screen on the second display region 300 or displays a still image included in the webpage screen on the second display region 300 (S10 to S25).

The controller 180 determines whether or not a moving or still image included in the webpage screen has been selected (S40). In the case where the first display module 151*a* on which the first display region 200 is displayed is a touch screen, the controller 180 determines that a moving or still image selection command has been input when the webpage screen has been touched. The user may also flick, toward the second display region 300, a moving or still image, which the user desires to reproduce or display on the second display region 300, from among the moving or still images included in the webpage screen.

Upon determining that a command to select a moving or still image has been input, the controller 180 reproduces the selected moving image on the second display region 300 or displays the selected still image on the second display region 300 (S45).

Figure 7:
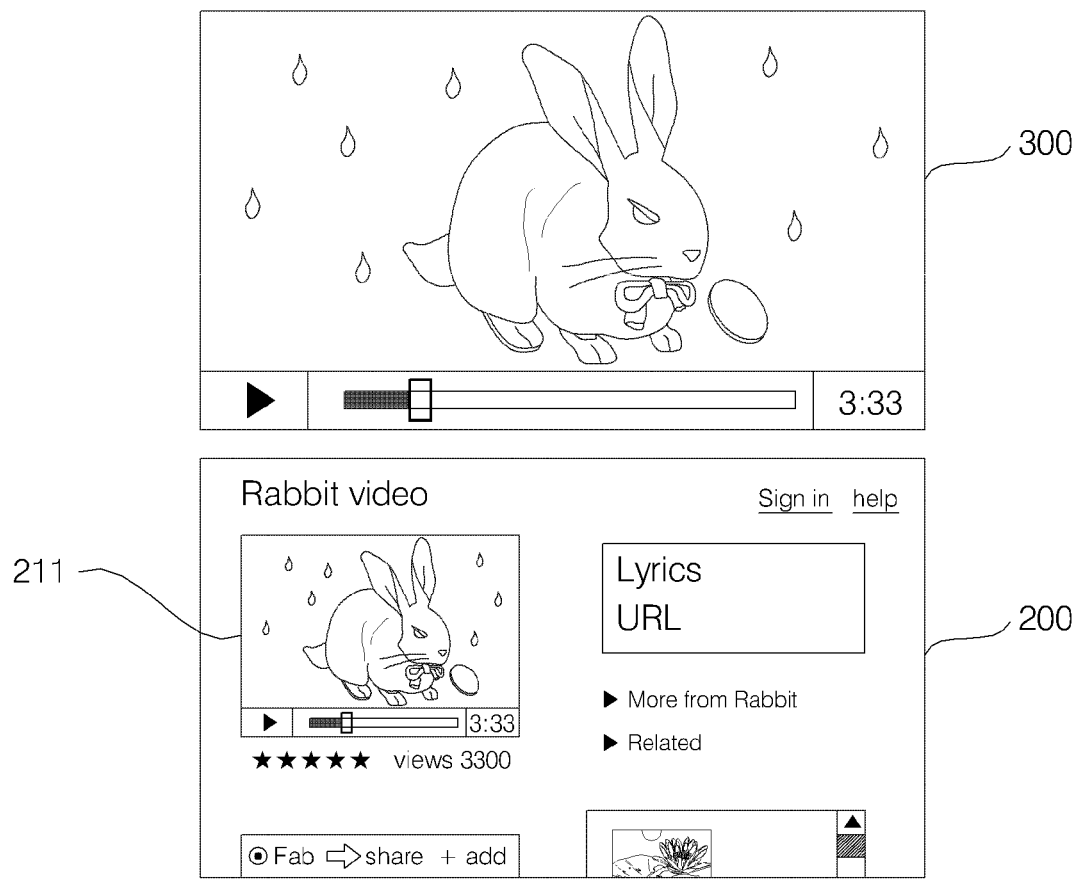
FIGS. 7 through 11 illustrate diagrams for explaining the method shown in FIGS. 5 through 6.

FIG. 7 illustrates screens displayed on display regions of a mobile terminal according to a fourth embodiment of the present invention. In this embodiment, the controller 180 reproduces a moving image 211, which is being reproduced on a webpage screen displayed on the first display region 200, on the second display region 300.

The controller 180 displays a webpage screen on the first display region 200 and determines whether or not any moving image, which is currently being reproduced, is present in moving images included in the webpage screen. In this embodiment, the webpage screen displayed on the first display region 200 includes the moving image 211 which is currently being reproduced. The controller 180 displays the moving image 211, which is being reproduced on the first display region 200, on the second display region 300.

In this embodiment, even when the user has not input a command to enlarge and reproduce a moving image to the mobile terminal, the controller 180 automatically displays the moving image, which is being reproduced on the webpage screen displayed on the first display region 200, on the second display region 300. The controller 180 may stop reproducing the moving image included in the webpage screen on the first display region 200 while reproducing the moving image 211 included in the webpage screen on the second display region 300. The controller 180 may reproduce the moving image on the second display region 300 until the user inputs a command to stop reproducing the moving image.

Figure 8:
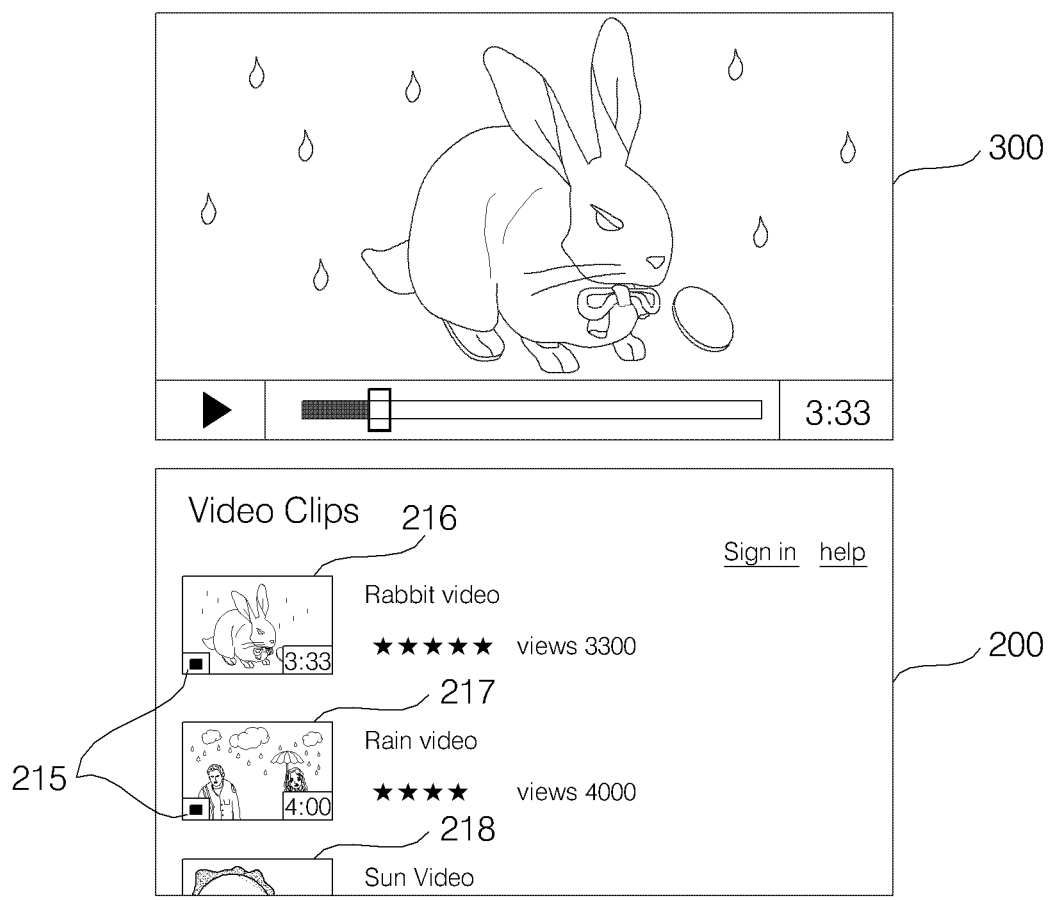

FIG. 8 illustrates screens displayed on display regions of a mobile terminal according to a fifth embodiment of the present invention. In this embodiment, the controller 180 stops reproducing moving images on the first display region 200 when a moving image is reproduced on the second display region 300.

As shown in FIG. 8, the controller 180 reproduces one of the moving images included in the webpage screen on the second display region 300. The controller 180 stops reproducing the moving images on the first display region 200 when one of the moving images is reproduced on the second display region 300.

The controller 180 displays a stop icon 215 on each of the moving images included in the webpage screen to indicate that reproduction of each of the moving images on the first display region 200 has been stopped. The user may resume reproducing each stopped moving image on the first display region 200 by operating the stop icon 215.

In this embodiment, the controller 180 may sequentially reproduce moving images 216, 217, and 218 included in the webpage screen on the second display region 300. Accordingly, the user can sequentially view the moving images included in the webpage screen on the second display region 300 without inputting a command to reproduce each moving image included in the webpage screen to the mobile terminal.

Figure 9:
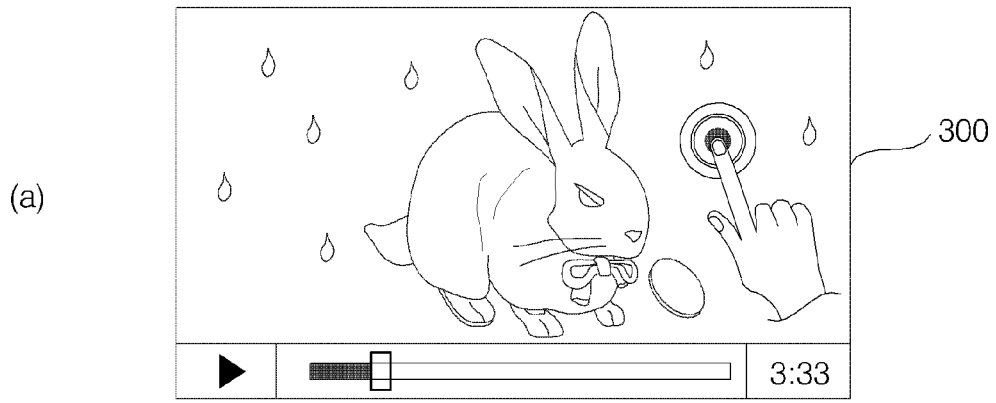
Figure 9:
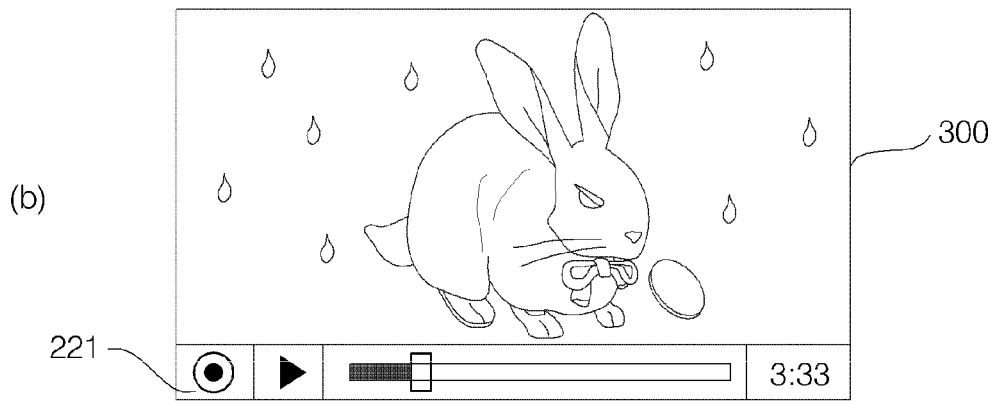
Figure 9:
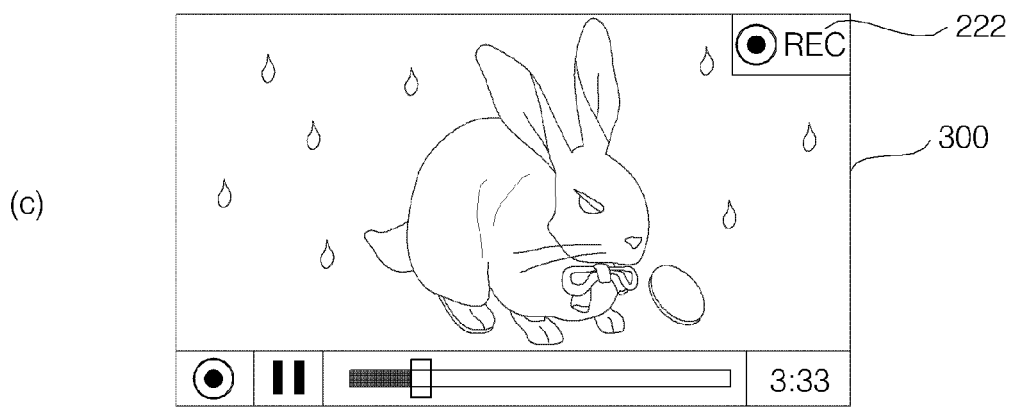

FIGS. 9(*a*) to 9(*c*) illustrate screens displayed on display regions of a mobile terminal according to a sixth embodiment of the present invention. In this embodiment, the controller 180 may record video or audio of a moving image that is being reproduced on the second display region 300.

In the case where the second display module 151*b* on which the second display region 300 is displayed is a touch screen, the user may touch the second display region 300 on which the moving image is being reproduced as shown in FIG. 9(*a*). Upon detecting that the second display region 300 has been touched, the controller 180 determines that a command to record video or audio of the moving image that is being reproduced.

In the case where a still image is being displayed on the second display region 300, the controller 180 may determine that a command to store the still image has been input upon detecting that the second display region 300 has been touched.

In addition, the controller 180 may display a moving image video or audio record icon 221 on the second display region 300 as shown in FIG. 9(*b*). The user may input a video or audio record command to the mobile terminal by operating the moving image video or audio record icon 221.

The user may specify and input a path for storage of the video or audio of the moving image to the mobile terminal before or after the moving image video or audio record command is input. The user may set the mobile terminal such that a video record command among the video or audio record command is input by default to the mobile terminal when the user touches the touch screen or operates the icon 221 while a moving image is being reproduced on the second display region 300.

As shown in FIG. 9(*c*), the controller 180 records the moving image that is being reproduced on the second display region 300 when a video record command has been input to the mobile terminal. The controller 180 displays a record indication icon 222 on the second display region 300 to indicate that the moving image is currently being recorded.

The user may stop or pause recording of the moving image by touching or operating the record indication icon 222. When a still image displayed on the second display region 300 has been stored, the controller 180 may display a storage indication icon on the second display region 300 to inform the user that the image has been stored.

Figure 10:
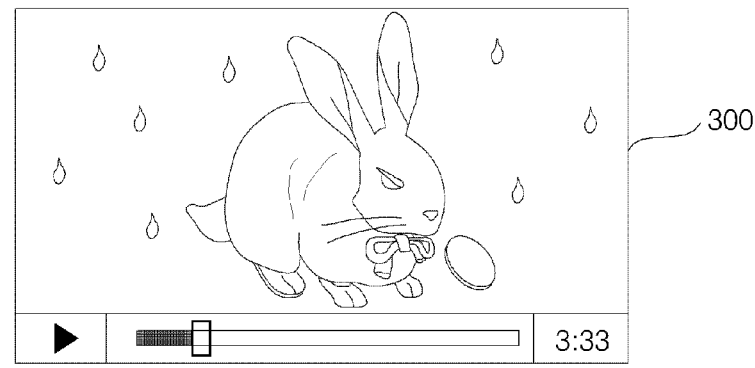
Figure 10:
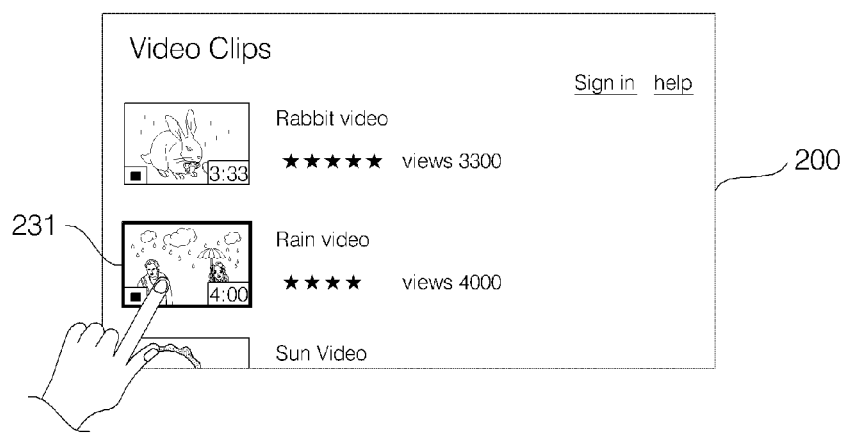
Figure 10:
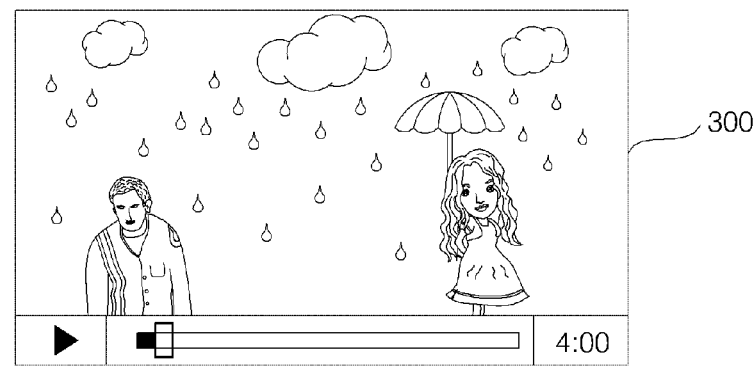
Figure 10:
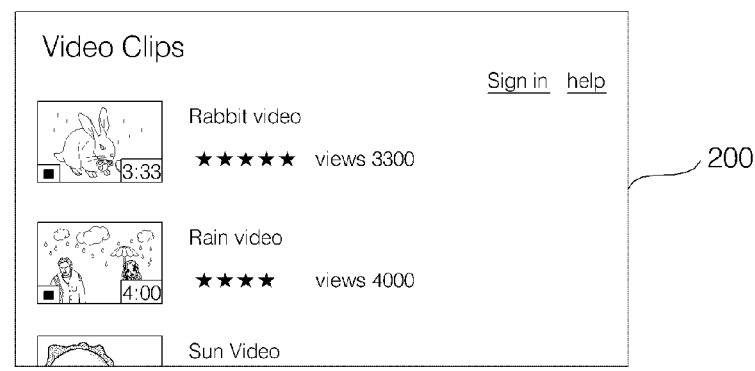

FIGS. 10(*a*) to 10(*c*) illustrate screens displayed on display regions of a mobile terminal according to a seventh embodiment of the present invention. In this embodiment, the user may select a moving image to be reproduced on the second display region 300 from among moving images included in the webpage screen.

When the first display module 151*a* on which the first display region 200 is displayed is a touch screen, the user may touch a moving image 231, which the user desires to reproduce on the second display region 300, as shown in FIG. 10(*a*). Upon detecting that the moving image 231 has been touched, the controller 180 determines that a command to reproduce the moving image has been input. When the moving image 231 has been touched, the controller 180 highlights the touched moving image.

The controller 180 reproduces the touched moving image 231, from among the moving images included in the webpage screen, on the second display region 300 as shown in FIG. 10(*b*). After touching the moving image displayed on the first display region 200, the user may flick the moving image toward the second display region 300. The controller 180 reproduces the flicked moving image on the second display region 300.

When a still image included in the webpage screen has been selected, the controller 180 may display the selected still image on the second display region 300.

Figure 11:
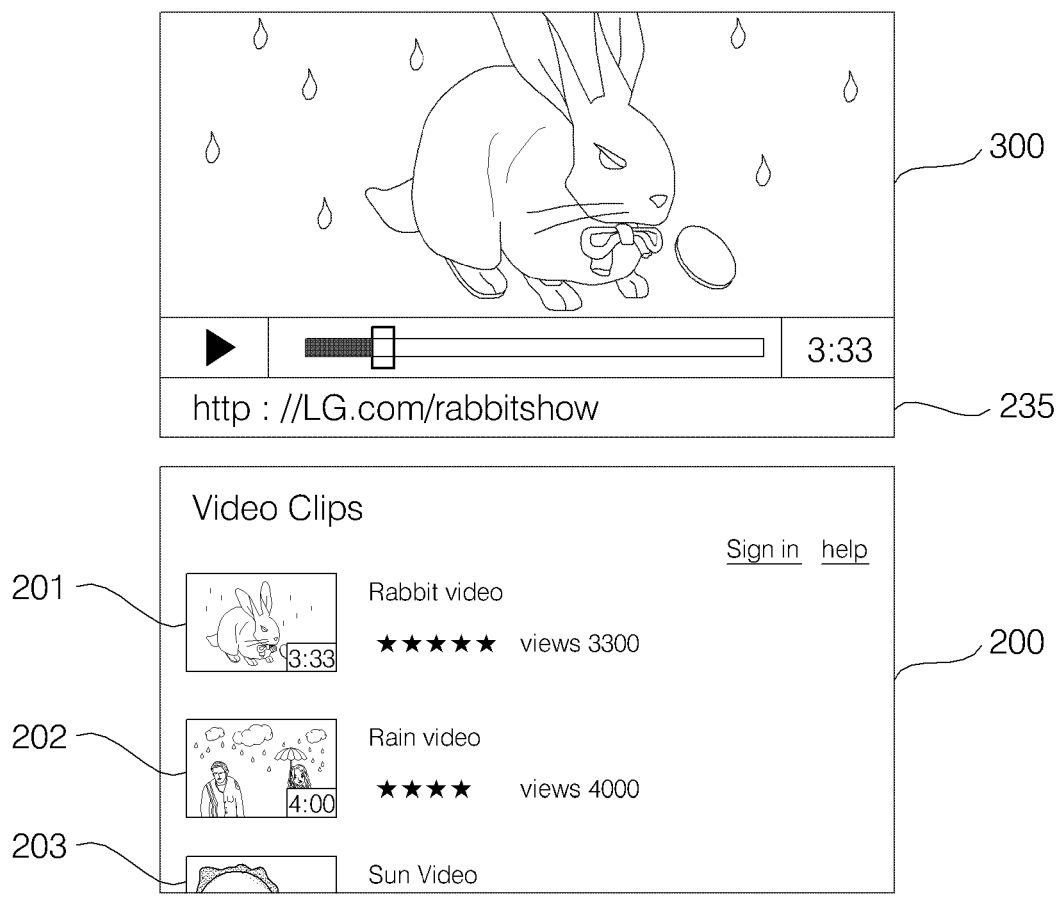

FIG. 11 illustrates screens displayed on display regions of a mobile terminal according to an eighth embodiment of the present invention. In this embodiment, the controller 180 may display an address of a moving image that is being reproduced on the second display region 300.

As shown in FIG. 11, the controller 180 may display an address bar 235 on the second display region 300. The controller 180 may display the address of the moving image which is currently being reproduced on the address bar 235. This allows the user to know the address of the moving image which is currently being reproduced. When a still image is being displayed on the second display region 300, the controller 180 may display an address of the still image on the address bar 235.

The mobile terminal and the method of controlling the operation of the same according to the present invention are not limited in their applications to the configurations and methods of the embodiments described above and all or some of the embodiments may be selectively combined to implement various modifications.

The method for controlling the mobile terminal according to the present invention can be embodied as processor readable code on a processor readable medium provided in a mobile terminal. The processor readable medium includes any type of storage device that stores data which can be read by a processor. Examples of the processor readable medium include Read-Only Memory (ROM), Random-Access Memory (RAM), CD-ROMs, magnetic tape, floppy disks, optical data storage devices, and so on. The processor readable medium can also be embodied in the form of carrier waves as signals transmitted over the Internet. The processor readable medium can also be distributed over a network of coupled processor systems so that the processor readable code is stored and executed in a distributed fashion.

Although the present invention has been illustrated and described above with reference to the specific embodiments, the present invention is not limited to the specific embodiments and it will be apparent to those skilled in the art that various modifications can be made to the embodiments without departing from the scope of the present invention as disclosed in the accompanying claims and such modifications should not be construed as departing from the spirit or scope of the present invention.

What is claimed is:

1. A method for controlling operation of a mobile terminal, the method comprising:
   displaying a webpage screen on a first display region, the webpage screen including a first moving image;
   receiving a first user input for selecting the first moving image included in the webpage screen;
   reproducing the first moving image on the first display region in response to the first user input;
   receiving a second user input for flicking the first moving image; and
   reproducing the first moving image on a second display region and stopping the reproducing of the first moving image on the first display region in response to the second user input.

2. The method according to claim 1, further comprising:
   stopping an output of audio of the first moving image being reproduced on the first display region, and outputting the audio of the first moving image being reproduced on the second display region.

3. The method according to claim 1, wherein the webpage screen further includes a second moving image, and the first display region is located on a touch screen, the method further comprising:
   determining whether or not the second moving image included in the webpage screen has been touched;
   stopping the reproducing of the first moving image on the second display region in response to a determination that the second moving image has been touched; and
   reproducing the second moving image on the second display region.

4. The method according to claim 1, wherein the webpage screen further includes a second moving image, the method further comprising:
   sequentially reproducing the first and second moving images on the second display region.

5. The method according to claim 1, wherein the webpage screen includes a plurality of moving images, the method further comprising:
   reproducing one moving image of the plurality of moving images, to which higher priority is assigned, among the plurality of moving images.

6. The method according to claim 5, wherein the priority assigned to a moving image that is being reproduced or a moving image that a user has input a command to select, from among the plurality of moving images included in the webpage screen, is higher than the priority assigned to other moving images of the plurality of moving images.

7. The method according to claim 1, wherein the webpage screen includes a plurality of moving images.

8. The method according to claim 1, wherein the first display region is located on a first display module, and the second display region is located on a second display module, the first and second display modules being physically separate.

9. The method according to claim 1, wherein the first display region and the second display region are located on different regions of one display module.

10. The method according to claim 1, further comprising:
    displaying information regarding an address of the first moving image, which is being reproduced on the second display region, on the first or second display region.

11. The method according to claim 1, further comprising:
    determining whether or not a command to record video or audio of the first moving image, which is being reproduced on the second display region, has been input; and
    recording video or audio of the first moving image in response to a determination that the command to record the video or audio of the moving image has been input.

12. A mobile terminal comprising:
    a display comprising a first display region and a second display region; and
    a controller configured to:
    display a webpage screen including a first moving image on the first display region;
    receive a first user input for selecting the first moving image included in the webpage screen;
    reproduce the first moving image on the first display region in response to the first user input;
    receive a second user input for flicking the first moving image; and
    reproduce the first moving image on the second display region and stop the reproducing of the first moving image on the first display region in response to the second user input.

13. The mobile terminal according to claim 12, wherein the controller stops outputting an audio of the first moving image being reproduced on the first display region and outputs the audio of the first moving image being reproduced on the second display region.

14. The mobile terminal according to claim 12, wherein the display comprises:
    a touch screen for displaying the first display region,
    wherein the webpage screen further includes a second moving image, and the controller determines whether or not the second moving image included in the webpage screen has been touched, stops reproducing the first moving image on the second display region in response to a determination that the second moving image has been touched, and reproduces the second moving image on the second display region.

15. The mobile terminal according to claim 12, wherein the display system includes a display module, and the first display region and the second display region are located on different regions of the display module.

16. A method for controlling operation of a mobile terminal, the method comprising:
    displaying a webpage screen on a first display region, the webpage screen including a first still image;
    automatically enlarging the first still image and displaying the enlarged first still image on a second display region;
    receiving a user input for flicking the first still image included in the webpage screen; and
    enlarging the first still image and displaying the enlarged first still image on the second display region in response to the user input.

17. A mobile terminal comprising:
    a display comprising a first display module configured to display a first display region and a second display module configured to display a second display region, wherein the first display module and the second display module are physically separate; and
    a controller configured to:
    display a webpage screen including a first moving image on the first display region;
    receive a first user input for selecting the first moving image included in the webpage screen;
    reproduce the first moving image on the first display region in response to the first user input;

receive a second user input for flicking the first moving image; and reproduce the first moving image on the second display region and stop the reproducing of the first moving image on the first display region in response to the second user input.

* * * * *